Patented Mar. 16, 1926.

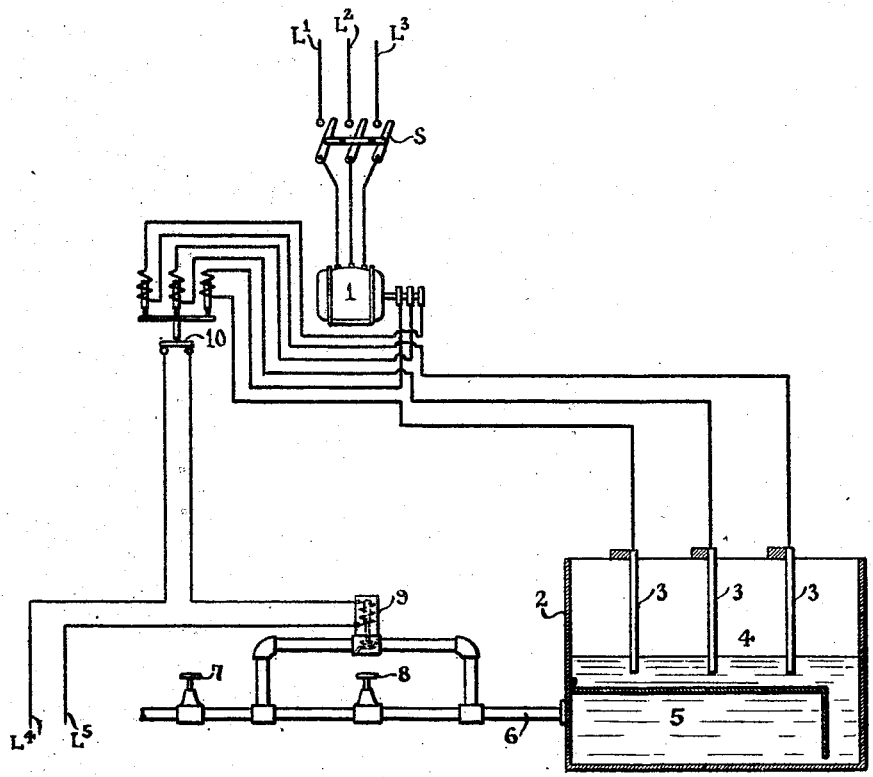

1,576,553

UNITED STATES PATENT OFFICE.

EDWIN W. SEEGER, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRICAL CONTROLLER.

Application filed April 13, 1922. Serial No. 552,296.

*To all whom it may concern:*

Be it known that I, EDWIN W. SEEGER, a citizen of the United States, residing at Milwaukee, in the county of Milwaukee and State of Wisconsin, have invented new and useful Improvements in Electrical Controllers, of which the following is a full, clear, concise, and exact description, reference being had to the accompanying drawing, forming a part of this specification.

This invention relates to electric controllers and more particularly to the control of induction motors by means of fluid rheostats.

Fluid rheostats are commonly employed in the secondary circuit of induction motors to effect the necessary resistance variation for starting thereof, and heretofore such rheostats were arranged to provide a given resistance decrease in a given time regardless of the load on the motor. However, in certain installations such as mine hoists the load on the motor varies between wide limits and it is desirable to vary the time required to effect a given resistance decrease in accordance with the load on the motor for minimization of the starting period of the motor.

The present invention has among its objects to provide a fluid rheostat controller for induction motors which is adapted during starting of the motor to vary the rate of resistance decrease in accordance with the load on the motor.

Another object is to provide a controller of the aforesaid character having means responsive to current conditions in the secondary circuit of the controlled motor for varying the rate of resistance decrease in such circuit during starting of the motor.

Various other objects and advantages of the invention will hereinafter appear.

The accompanying drawing illustrates diagrammatically an embodiment of the invention which will now be described it being understood that the embodiment illustrated is susceptible of modification without departing from the scope of the appended claims.

In the drawing, 1 indicates a 3-phase induction motor to be supplied with current from lines $L^1$, $L^2$ and $L^3$ through a main switch *s*, the secondary circuit of said motor being controlled by a fluid rheostat 2. Rheostat 2 is of a conventional type and comprises a plurality of electrodes 3, an electrolyte chamber 4 for said electrodes and a displacement chamber 5 located below said former chamber and in communication therewith. The level of the electrolyte within chamber 4 is controlled by air under pressure in displacement chamber 5, the air being admitted to said chamber subject to control by valves 7, 8 and 9.

Valve 8 is arranged between valve 7 and the displacement chamber 5 and valve 9 is of the solenoid operated type and is adapted upon response to by-pass the air around valve 8. The energizing circuit of valve 9 is controlled by a polyphase relay 10, said relay being normally closed to establish an energizing circuit for said valve from lines $L^4$ and $L^5$ and being provided with a plurality of operating windings each connected in series in one phase of the secondary circuit of motor 1.

Assuming that valve 7 is adjusted to admit more air therethrough than valve 8, it is apparent that with solenoid operated valve 9 closed the level of the electrolyte in chamber 4 will rise at a rate determined by the setting of valve 8 while upon opening of said solenoid operated valve the rate of rise of the electrolyte will be determined by the setting of valve 7. As is well known in starting an induction motor the rate at which the resistance is decreased in the secondary circuit thereof must be such as to prevent undesirable peak currents in such circuit. Valve 7 is adjusted to admit air at a rate for effecting proper starting of the motor in a minimum period under no load conditions while valve 8 is adjusted to admit air at a lesser rate for effecting proper starting of the motor in a minimum period under full load conditions. Relay 10 is adapted to open upon the occurrence of abnormal peak currents in the secondary circuit of the motor. Thus during starting of the motor under a load valve 9 is adapted to close upon the occurrence of abnormal current conditions in the secondary circuit of the motor to decrease the rate of rise of the electrolyte in chamber 4 and as soon as the current in said circuit drops to a given value said valve is adapted to open to increase such rate. It is therefore apparent that with the aforedescribed setting of valves 7 and 8, valve 9 will remain closed throughout the entire starting period of the motor if the motor is operating under full load conditions and will respond intermittently under intermediate load conditions to vary the rate of rise of the electrolyte in accordance with the load on the motor.

It should be noted that the invention is not limited to the type of rheostat shown in the drawing and that control of the rheostat can be effected in other ways to accomplish the aforedescribed results.

What I claim as new and desire to secure by Letters Patent is:

1. The combination with an induction motor, of a fluid rheostat for controlling the secondary circuit of said motor, means for controlling the immersion of the electrodes of said rheostat comprising means for increasing the immersion of said electrodes at a constant rate under given load conditions of said motor, and electromagnetically controlled means acting under given current conditions in the secondary circuit corresponding to a decrease in the load on said motor to increase the rate of immersion of said electrodes.

2. The combination with an induction motor, of a fluid rheostat for controlling an electrical condition of said motor, pneumatic means for varying the immersion of the electrodes of said rheostat, control means for said pneumatic means including means for constantly increasing the immersion of the electrodes at a given minimum rate, and means responsive to variations in such electrical condition of said motor to vary the rate of immersion of said electrodes in accordance with variations in the load on said motor.

3. The combination with an induction motor, of a fluid rheostat for controlling the secondary circuit of said motor, pneumatic means for varying the immersion of the electrodes of said rheostat, control means for said pneumatic means including means for increasing the immersion of the electrodes at a given minimum rate, and cooperating means responsive to current conditions in the secondary circuit of said motor to increase the rate of immersion of said electrodes in accordance with variations in the load on said motor.

4. The combination with an induction motor, of a fluid rheostat for controlling the secondary circuit of said motor, pneumatic means for varying the immersion of the electrodes to decrease the resistance of the secondary circuit of the motor during starting, control means for said pneumatic means including means for decreasing said resistance at a constant rate under full load conditions of the motor, and means acting jointly with said first mentioned means for decreasing said resistance at a constant rate under no load conditions of the motor, said last-mentioned means also providing for intermediate variations in the rate of decrease of said resistance corresponding to variations in the load on said motor.

5. The combination with an induction motor, of a fluid rheostat for controlling the secondary circuit of said motor, pneumatic means for varying the immersion of the electrodes of said rheostat, control means for said pneumatic means including a plurality of valves one for restricting the immersion of the electrodes to a given rate and the other for by-passing said former valve to increase such rate, and electromagnetic control means for said latter valve responsive to given current conditions in the secondary circuit of said motor to vary the rate of immersion of said electrodes in accordance with the load on said motor during starting.

6. The combination with an induction motor, of a fluid rheostat adapted to control the resistance in the secondary circuit thereof and comprising an electrolyte tank and a plurality of electrodes extending therewithin for coaction with the electrolyte, pneumatic means for varying the immersion of said electrodes and thereby the resistance of said rheostat, control means for said latter means including a plurality of valves one being adapted to admit air at a given rate and the other being arranged between the former and said rheostat for admitting air at a lesser rate, and an electromagnetically operated valve for by-passing said latter valve, said electromagnetically operated valve being responsive to current conditions in the motor circuit to vary the rate of immersion of said electrodes in accordance with the load on the motor.

7. The combination with an induction motor, of a fluid rheostat for controlling the secondary circuit of said motor, fluid pressure means for varying the immersion of the electrodes of said rheostat, control means for said fluid pressure means including a plurality of valves, one for restricting the immersion of the electrodes to a given rate and the other for supplying additional fluid to increase such rate, and electromagnetic control means for said latter valve, responsive to given current conditions in the secondary circuit of said motor, arranged to intermittently open and close the same to vary the rate of immersion of said electrodes.

8. The combination with an induction motor, of a fluid rheostat for controlling the secondary circuit of said motor, fluid pressure means for varying the immersion of the electrodes of said rheostat, control means for said fluid pressure means including a plurality of valves, one for restricting the immersion of the electrodes to a given minimum rate and the other for supplying additional fluid to increase such rate, and electromagnetic control means for said latter valve arranged to intermittently open and close the same to vary the rate of immersion of said electrodes in steps, the value of said steps being variable automatically in accordance with the load on said motor during starting.

In witness whereof, I have hereunto subscribed my name.

EDWIN W. SEEGER.